Figure 5:
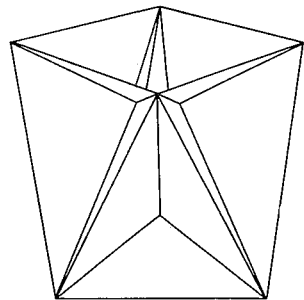

Sept. 11, 1956 E. K. P. GRAHAM 2,763,000
REFLECTOR FOR RADAR PURPOSES
Filed June 16, 1953 3 Sheets-Sheet 1
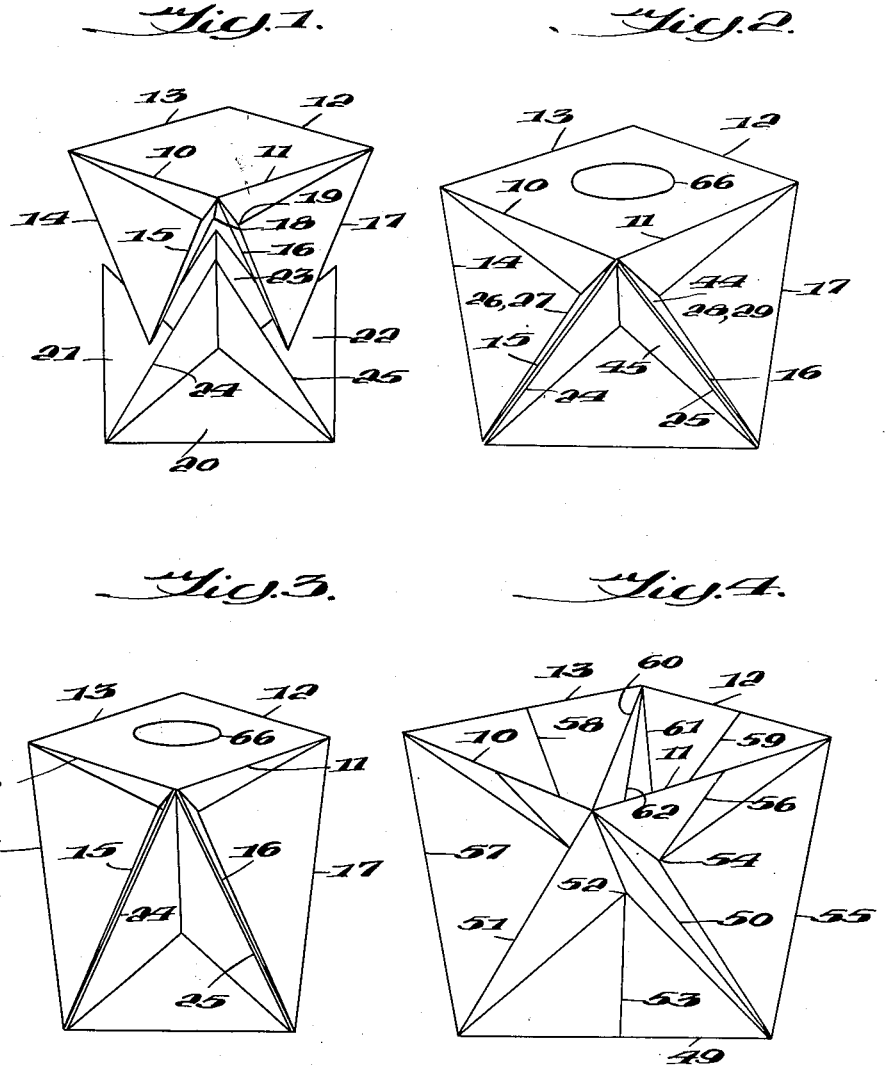
INVENTOR
EDWARD K. P. GRAHAM,
BY *Lawry and Taylor*
ATTORNEYS Sept. 11, 1956 E. K. P. GRAHAM 2,763,000
REFLECTOR FOR RADAR PURPOSES
Filed June 16, 1953 3 Sheets-Sheet 3

INVENTOR
EDWARD K. P. GRAHAM,

BY *Lawson and Taylor*

ATTORNEYS

United States Patent Office 2,763,000
Patented Sept. 11, 1956

2,763,000

REFLECTOR FOR RADAR PURPOSES

Edward K. P. Graham, Stockholm, Sweden, assignor to Svenska Aktiebolaget Gasaccumulator, Lidingo (near Stockholm), Sweden, a corporation of Sweden Application June 16, 1953, Serial No. 362,117

Claims priority, application Sweden October 16, 1952

7 Claims. (Cl. 343—18)

It has been proposed to combine a number of pyramidic, total reflecting bodies into a unity in order to use this unity as a reflector for radar purposes. Such a reflector may, in use, be mounted in such a position or in such a manner as to provide with full efficiency practically equal reflecting power in all directions in a single plane, usually the horizontal plane, as well as within certain radial angularly dispersed areas to each side of said plane.

A radar reflector of this kind may for instance be mounted upon buoys for marking shoals, upon high towers to warn airplanes, or upon a life raft for making it possible to find said raft, and so on. In all of these cases it is necessary that the reflector be light in weight, require very little space, and supply with full efficiency high reflecting power.

It has already been proposed to make radar reflectors foldable or defoldable, thus combining the two requirements of a high reflecting power and a small space demand. Such reflectors are, however, impracticable in certain cases. For instance, an essential loss of time may occur in urgent cases when setting up or folding together the reflector. Further, even though they require a small amount of space in cross section, they are usually rather elongated in a vertical direction, which may under certain circumstances be disadvantageous. Finally, they are rather expensive.

The present invention refers to a radar reflector which does not require folding, which occupies a minimum of space in its functional state, while still maintaining the requisite radiation properties, and which also can be made in a very stable and durable construction, and can be manufactured in a simple and inexpensive manner.

According to the invention, the reflector is composed of eight pyramidic totally reflecting bodies, equally distributed into two separate units, four in each unit. The bottom unit comprises four pyramidic bodies distributed around the four sides of a horizontal square orientated in such a way that the respective base plane of each pyramid extends upwards, and in such a way that one of the enclosing sides of said base is coincident with one of the sides of said square. Similarly, the upper unit also contains four pyramidic bodies distributed around the four sides of a horizontal square, similarly orientated with the exception that their base planes extend vertically downwards. The two units are joined in such a way that the reflecting pyramidic bodies belonging to one unit are interspaced between the respective reflecting bodies of the opposing unit. It is understood, of course, that utilizing the reflectors in such a way is intended to be merely an example and not a limitation upon the scope of the invention.

Figure 10:
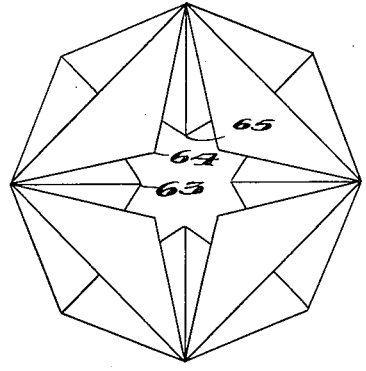
Figure 11:
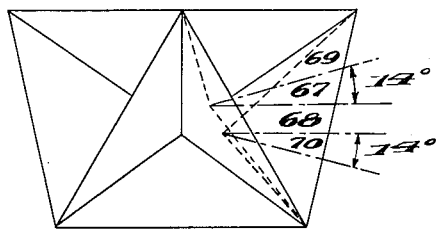
Figure 12:
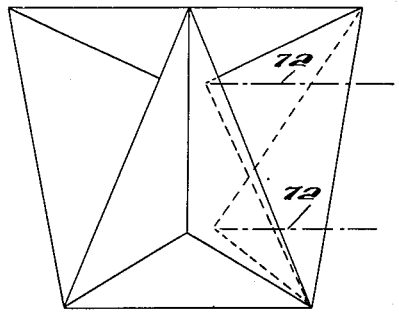

Further details of the invention will be evident from the following specification when viewed in connection with the attached drawings, which show some different forms of execution of the invention. Fig. 1 thereby shows a radar reflector of the simplest kind, in which the invention has been used. Figs. 2, 3, 4 and 5 show modified forms of execution of the invention, and Figs. 6, 7, 8 and 9 show the stamped raw material, from which the respective radar reflectors shown in Figs. 2, 3, 4 and 5 are formed. Fig. 10 shows a radar reflector according to the invention, as seen from above, and Fig. 11 shows a radar reflector of the same kind shown in Figs. 2 and 4, as seen from the side. Finally, Fig. 12 shows a radar reflector of the same kind shown in Figs. 3 and 5, also as seen from the side.

Thus, in Fig. 1 a radar reflector composed of two units is shown, in which each unit is composed of four elementary reflectors (pyramidic bodies). To gain an improved visual impression, the two units in Fig. 1 have been somewhat separated. It would be immediately evident to one skilled in the art how said radar reflector would appear with the upper unit lowered onto the lower unit, the two units joined, as they exist in their functional state.

Four base lines of the four elementary reflectors of the upper unit are shown as 10, 11, 12 and 13. They are arranged in a square figure. The four elementary reflectors, composing the four sides of the upper and lower units, are assumed in this example, to have the shape of equally dimensioned three sided pyramids with 90° angles at the peaks (as indicated by 18 and 19) of each side, and are mounted in such a way that their open sided base planes, enclosed for instance by the edges 10, 14 and 15, or 11, 16 and 17, are perpendicular to the squared plane 10, 11, 12 and 13. Due to the perspective of the drawing, only two of the four elementary reflectors, belonging to the upper reflector unit in Fig. 1, are shown. It should be noted that the peaks of the pyramidic reflectors as exemplified by 18 and 19, face inwards towards the center area of the two units when assembled as a whole. The lower reflector unit is composed in an identical way, of four elementary pyramidic reflectors 20, 21, 22 and 23. The base planes of the elementary reflectors are, however, extended vertically upwards, and the whole unit is rotated in a horizontal plane such that the horizontal square figure formed by the base lines is angularly displaced 45° from the projection of the figure 10, 11, 12 and 13.

Regarding now Fig. 1, one will, however, see that the edge line 15 is not parallel to the edge line 24 of the elementary reflector 20. Similarly, the edge line 25 is also not parallel to the edge line 16. When the two units are combined, consequently the lines 15 and 24 and 16 and 25, respectively, will not coincide but will cross each other at a rather oblique angle. In a corresponding way the edge lines situated on the back side of the radar reflector will also cross each other. The two units will therefore be placed in mutual contact at eight distinct points, at which they may be welded together or fixed together in any suitable way.

Even if such a construction is fully usable for its purpose, it is of course not as rigid a construction as one in which the edge lines of each elementary reflector, belonging to the upper reflector unit, fully coincide with the corresponding edge lines of elementary reflectors, belonging to the lower unit, such that the full contacting length may be welded. Such a line formed weld is achieved when the reflectors shown in Figs. 2 and 3 are combined. To explain this, refer first to Fig. 6, which shows the work piece, from which a reflector unit in the radar reflector shown in Fig. 1 or 2 is produced by creasing. The work piece is stamped out from a suitable metal sheet plate or other sheet, provided with a suitable layer for reflecting radio beams. The stamping lines are the solid lines drawn in Fig. 6. The work piece after stamping is creased or bent along the dotted lines in Fig. 6 so that the upper base plate is enclosed by the edge lines 10, 11, 12 and 13. The flag-formed pieces, bent down, are further bent, however, in an opposite direction to the bending of the edges 10, 11, 12 and 13, such that the two free edges 26 and 27, or 28 and 29, respectively, are directed inwards until they coincide. It will then be evident that after welding together or joining in any suitable way the edges 26 and 27, or alternatively of the edges 28 and 29, the three triangular parts of the flag-formed parts of the figure will form elementary reflectors in the form of equally dimensioned three-sided pyramids with 90° angles at the top of each of the three sides. This is well-known to be the ideal form of an elementary reflector. Each of the groups of edges 10, 14 and 15 as well as 11, 16 and 17 will, therefore, form one equilateral triangle. These triangles as well as the two remaining triangles formed by the flag-formed parts, which are not indicated by reference numerals, form the four sides, each side showing the inside of the pyramids. These four sides are in Fig. 1 bent in such a way that the open faced triangular planes of the pyramids are perpendicular to the base enclosed by the edge lines 10, 11, 12 and 13. Therefore, the disadvantage of contact between the upper and lower units at only eight points will occur.

An investigation, however, now proves that if the bending is not completed to the extent that the four triangular open base planes of the pyramids are perpendicular to the square base surface, a bending angle may be obtained, in which the edge lines of the lower and of the upper units coincide, as indicated in Fig. 2. To do this, however, the opening surfaces have to be inclined to the vertical level by an angle of about 14°. This will not, per se, be disadvantageous, particularly if the radar reflector as a whole can be mounted in such a way that the base 10, 11, 12 and 13 will always be in a horizontal position. Because of the inclination of the sides, the space bisectrices of the total reflecting pyramids will alternatively be inclined 14° upwards and 14° downwards in relation to the horizontal plane, viz. such that the elementary reflectors belonging to the upper unit, develop space bisectrices, inclined upwards, and the elementary reflectors belonging to the lower unit, develop space bisectrices, inclined 14° downwards. The consequence will be that a fully satisfactory reflection is obtained in the horizontal level, but as soon as one deviates from the horizontal level, the elementary reflectors belonging to one unit, will be inactive due to "shadowing," and above a 28° deviation the remaining four elementary reflectors belonging to the other unit will be inactive. Even observers whose position deviates from the horizontal plane within the last mentioned angle of 28° will be unable to observe the radar reflector from all directions in a horizontal plane, since the reflector will be unable to reflect the radar beam in certain directions, comprising up to about half of the horizon or more.

In most cases, this circumstance will be of no account, and the radar reflector will be fully usable for its purpose. There may, however, be cases when a decreased visibility occurs from said circumstance, for instance when the radar reflector is applied to the pole of a lifeboat. If strong sea movement and rolling occurs, it may happen that even when the radar antenna of the seeking vessel during shorter or longer periods is positioned within said angle of 28°, if simultaneously the radar reflector happens to be turned in such a posiiton that it turns one of the "shadowed" angles on to the radar antenna, it will consequently not be observed.

Figure 6:
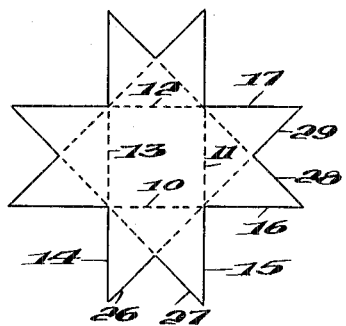
Figure 7:
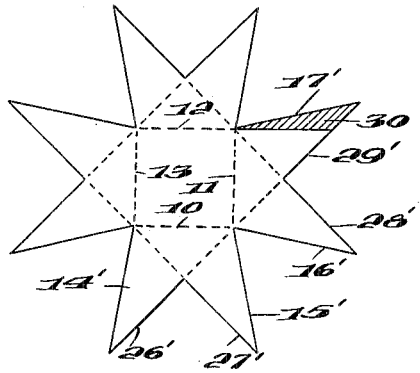

This disadvantage is obviated by the arrangement shown in Figs. 3 and 7. These figures substantially correspond to the assembly and method of construction used in Figs. 2 and 6. According to this arrangement, the opening triangular base of each of the elementary pyramidic reflectors is no longer in the form of an equilateral triangle, but in the form of a triangle of two elongated sides. Thus, in Fig. 7 the lengths of sides 26', 27', 28' and 29' are about 1.1 times the lengths of sides 10, 11, 12 or 13, whereas the sides 14', 15', 16' and 17' are roughly 1.33 times the sides 10, 11, 12 and 13 in length. When such a sheet is bent in the manner described above in connection with Fig. 6, the total radar reflector shown in Fig. 3 will be obtained. This has horizontal space bisectrices, situated slightly higher than the radar reflector shown in Fig. 2. This unessential increase in height is, however, compensated for, at least partially, by the reflector according to Fig. 3 giving a better reflection power due to the increased area of the side surfaces, in Fig. 7 indicated by the shadowed area 30.

The method of manufacturing the radar reflectors, demonstrated by means of Figs. 6 and 7, is rather uneconomical since it is not possible from a running sheet of metal tape to stamp out the working pieces indicated in said figures without a rather heavy spoilage of material. Also since each pyramidic structure of the two reflector units must be welded after sizing and bending along two edges, represented for instance by the edges 26—27 or 28—29, and since the two reflector units must then be combined necessitating further welding, for example at the edge lines 14, 15, 16 and 17 to their respective edge lines of the lower reflector unit in contact, considerable material as well as labor will be expended.

Figure 8:
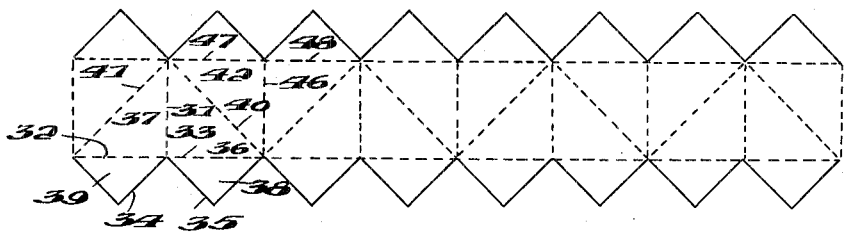
Figure 9:
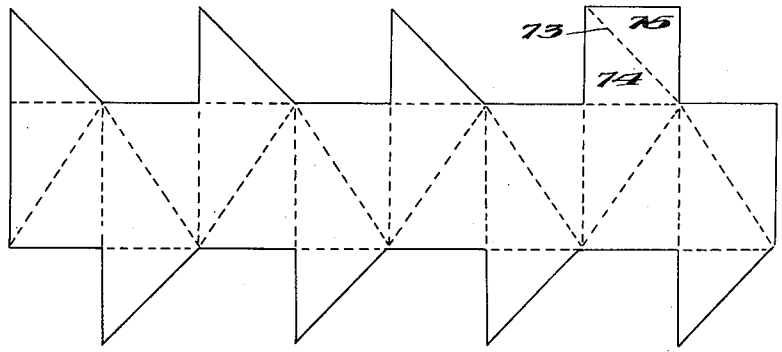

An essential simplification of the production may take place by stamping the work piece from a running tape in the shape, indicated in Fig. 8 and in Fig. 9, rather than as shown in Fig. 6 and Fig. 7. Fig. 8 will then give a reflector with plus or minus 14° space bisectrix error, whereas the working piece according to Fig. 9 will give a reflector with correct positioning of the space bisectrix but with an opening of the different pyramidic figures, comprising two elongated equal sides, for example sides 14 and 15.

The working piece, shown in Fig. 8, for production of a reflector, is sufficient for producing all of the elementary reflectors, contained in the complete radar reflector, but this radar reflector will then have no base plate of the type enclosed by the edges 10, 11, 12 and 13 in Figs. 1, 2 and 3. The bending of the tape in Fig. 8 will take place in such a way that one starts with for instance the bending line 31, which is bent in such direction that the fold will be concave upwards. The two bending lines 32 and 33 are then bent in the same direction so that edge lines 34 and 35 will meet. Thus, the first elementary reflector is produced, with its sides formed first by the triangular part 36, then by the triangular part 37, and finally by the triangular part, half of which is formed by the flap 38 and half of which is formed by the flap 39. The welding of the joint 34—35 will thus be a rather simple matter, as it will be a matter of a pure butt weld. A first elementary reflector having been produced in this way, the sheet is bent along the bending lines 40 and 41, this time, however, in an opposite direction. This bending should suitably take place rather far, so that the two panels 36 and 42 or 37 and 43 form the same angular relationship shown in the perspective drawing Fig. 2 between the corresponding planes 44 and 45. Then, the first bending procedure is repeated, whereby the bending line 31 corresponds to the line 46, the line 32 corresponds to the line 47 and the line 33 corresponds to the line 48. In this way the second elementary reflector is formed. By fulfilling the bending operation in the same way, one will be obtaining as a final result a reflector such as shown in Fig. 4.

It is natural that a figure, surrounded by so many limiting lines, running in different directions, and drawn perspectively without shadowing, will seem rather confusing at first observation. The perspective will, however, occur more clearly to the reader after the following explanation.

The upper squared surface, in which there is no top plate in this case, is indicated by lines 10, 11, 12 and 13. The corresponding bottom surface in Fig. 4 is indicated only by line 49. This line is part of the triangular opening 49—50—51 of one of the elementary reflectors, while the point 52 is directed inwards to the core of the radar reflector. The line 53 indicates the connection line between the two triangular flaps 38 and 39 of Fig. 8, whereas the three lines, running from the point 52 to the corners of the triangle 49—50—51, form the edges of the pyramidic body. On each side of this elementary reflector a further elementary reflector is visible. The one at the right thereof has a peak 54, the side edges 50, 55 and 11 and the joint 56 formed when joining the two flaps 47 and 48 of Fig. 8. The reflector situated to the left is partly shadowed behind line 51.

Of the remaining elementary reflectors, two are fully hidden by the just described elementary reflectors, which are outwardly limited by the lines 55 and 57, respectively, and the last three reflectors are seen from the backside or from the inside through the opening between the sides 10, 11, 12 and 13. The lines 58 and 49 are joining lines for connecting the flaps of one of the sides of two elementary reflectors, belonging to the upper reflector unit, whereas the lines 60, 61 and 62 limit the upper corner of the triangular opening of the last elementary reflector and indicate the visible edge line respectively of a lower reflector unit. It can be seen that the radar reflector as a whole shown in Fig. 4 is formed from one single unit.

If one should for some reason not want to make such a butt weld or butt joint as described in Fig. 4 at lines 53, 56, 58 and 59, then one may of course make the third side of any elementary reflector in one piece. This means, however, that the loss of material for stamping out the working piece from a strip will be somewhat greater. This last mentioned type of stamping is shown in seven of the flaps, shown in Fig. 9. In Fig. 9 the dimensions have also been changed in such a way that a reflector of the type described above in connection with Fig. 3 minus the upper and bottom plates and made in one single piece with a minimum of joints will be obtained. This reflector is shown in Fig. 5 showing all essential parts in a similar manner as in Fig. 4. It is assumed that therefore no further description of Figs. 5 and 9 is required. However, one may easily provide a reflector according to Fig. 9 with a base plate on the bottom or on both bottom and top if four or eight triangular flaps such as flap 73 shown in Fig. 9 are instead made square formed and bent along the line 73. Thereby the triangle 74 will form one side in an elementary reflector, whereas the triangle 75 will form one fourth of the base plate, which will thus by welding comprise four of such parts, welded together along the diagonal lines of the base plate.

Fig. 10 shows one of the radar reflectors according to Fig. 4 or Fig. 5 seen from above. It will be evident from this figure that an interior free space is present in the radar reflector, limited by the eight points 63, 64, 65 and so on of the elementary reflectors, directed inwards, said points being situated on an imaginary cylindrical surface about a central axis extending through the radar reflector. It would therefore be possible to mount the reflector on a bar or a pole or the like, which will make mounting very easy. For several purposes it will be fully sufficient to support the reflector by letting the eight points contact the outer surface of the pole, since four of the eight points are situated on a somewhat higher plane than the remaining four points. If, however, the reflector is subject to vibrations or other influences of that kind one may assume that said supporting means will not be sufficient. One may also use the construction, shown in Fig. 2 or 3, with a hole 66 cut up through the bottom plate as well as the top plate. The two holes thus present will in combination with the eight points give a very good support of the reflector. To slide it down along the pole, one must merely place a ring or other stop arrangement underneath the bottom plate of the radar reflector. Of course, it is also possible to use a reflector such as shown in Fig. 4 or 5 and to either provide it with a separate bottom plate or top plate or both, welded to it, or to construct it with a bottom plate and/or a top plate, from four square flaps, in the manner indicated by 73, 74 and 75 in Fig. 9. In this case it is not necessary to weld together the four flaps, but they may be bent incompletely, so that they form about a 36° angle with the imaginary plane of the bottom plate. Its contact points will then be so placed in an imaginary circle such that their projection falls upon the same circle upon which the projection of the points 63, 64, 65 also is located.

Fig. 11 shows a plane picture of a reflector according to Fig. 2 or 4, with one elementary reflector protruding from below and one protruding from above, indicated by dotted lines. From the edges or points of these reflectors horizontal lines 67 and 68 are drawn. The space bisectrices are also drawn in the form of the lines 69 and 70. One will then immediately see that the space bisectrices diverge as explained above, from the horizontal plane by an angle of about 14°. This angle is not exactly reproduced upon the drawing, because the space bisectrices are inclined to the level of the paper.

A corresponding plane picture of the reflector according to Fig. 3 or 5 is shown in Fig. 12. It is evident from the lines 71 and 72 that the space bisectrices of said reflector extend in a horizontal plane.

The invention is of course not limited to the forms of execution shown and described above, but different modifications may be made within the scope of the invention. For instance, different intermediate forms of such reflectors may have a 14° deviation of the space bisectrix plus a ratio between the equal sides of the opening surface and the third side of said surface of about 1:1.33. In this way one may provide a reflector of less height than the reflector according to Figs. 3 and 5 but with a reasonable and allowable deviation of the inclination of the space bisectrix to the horizontal plane. The forms of execution, shown on the one side in Figs. 2 and 4 and on the other side in Figs. 3 and 5, may therefore only be regarded as limiting values of what is practical, but the most suitable dimensions in each separate case should as a rule be found between these two limiting values.

What is claimed is:

1. Radar reflector for circular division of the reflection power, comprising eight three-sided, pyramidic, total reflecting elementary reflectors, four of which are turned with the base edges of the opening surface upwardly, said base edges being rigidly connected to form a first square, said remaining four elementary reflectors being turned with the base edges of the opening surfaces downwardly and connected to form a second rigid square, said two thus constructed reflector units being mounted together with the points of the elementary reflectors belonging to one reflector unit interacting in the triangular spaces between the elementary reflectors of the other reflector unit, and the inclined edges of each pair of adjacent elementary reflectors being rigidly connected.

2. Radar reflectors according to claim 1, in which said elementary reflectors are arranged with openings of equal sides and with opening planes inclined in such a way that the space bisectrices of the elementary reflectors are inclined alternatively about 14° upward and 14° downward of the horizontal plane.

3. Radar reflectors according to claim 1, in which said elementary reflectors are arranged with two sides of the opening about equal to 1.33 times the third side of the opening and with the opening level inclined in such a way that the space bisectrices of the elementary reflectors will coincide with the horizontal plane.

4. Radar reflectors according to claim 1, in which the openings of the elementary reflectors have such an inclination that the space bisectrices of the elementary reflectors are inclined from the horizontal plane by an angle of between 0° and about 14°, and simultaneously the two sides of the openings adjacent to the base line are prolongated to such a value between 1 times the length of the basic line and 1:33 times the length of the basic line, that adjacent sides of the opening surface are running parallel and close to each other.

5. Radar reflector according to claim 1, in which each reflector unit is formed from a continuous strip whereby the edge lines of the reflector openings of adjacent elementary reflectors are integral.

6. Reflector according to claim 5, in which a plate is connected to at least one of the square openings obtained between the four connected base lines of the openings of the elementary reflectors.

7. Radar reflector according to claim 6, in which the bottom plate and/or top plate contains a circular hole, the diameter of which is equal to the distance between diametrically opposite pyramidic peaks facing the interior of the reflector.

References Cited in the file of this patent

UNITED STATES PATENTS 2,452,822     Wolf _____ Nov. 2, 1948